(12) United States Patent
Lee et al.

(10) Patent No.: US 8,223,876 B2
(45) Date of Patent: Jul. 17, 2012

(54) APPARATUS FOR RECEIVING SIGNALS IN OFDM COMMUNICATION SYSTEM HAVING MULTIPLE ANTENNAS AND METHOD THEREOF

(75) Inventors: Yu-Ro Lee, Daejon (KR); Min-Ho Cheong, Daejon (KR); Hee-Jung Yu, Daejon (KR); Jong-Ee Oh, Daejon (KR); Chan-Ho Yoon, Daejon (KR); Young-Gyun Kim, Laguna Hills, CA (US); Sok-Kyu Lee, Daejon (KR); Seung-Chan Bang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 492 days.

(21) Appl. No.: 12/443,686

(22) PCT Filed: Sep. 21, 2007

(86) PCT No.: PCT/KR2007/004666
§ 371 (c)(1),
(2), (4) Date: Mar. 30, 2009

(87) PCT Pub. No.: WO2008/038972
PCT Pub. Date: Apr. 3, 2008

(65) Prior Publication Data
US 2010/0002806 A1 Jan. 7, 2010

(30) Foreign Application Priority Data

Sep. 29, 2006 (KR) .................. 10-2006-0096167

(51) Int. Cl.
*H04L 27/28* (2006.01)
*H04L 1/02* (2006.01)
*H04B 1/10* (2006.01)

(52) U.S. Cl. .................. 375/267; 375/347; 375/349
(58) Field of Classification Search .................. 375/260, 375/267, 346, 347, 349
See application file for complete search history.

(56) References Cited

U.S. PATENT DOCUMENTS 6,614,861 B1 * 9/2003 Terry et al. .................. 375/347
(Continued)

FOREIGN PATENT DOCUMENTS

| KR | 1020060012825 | 2/2006 |
| KR | 1020060098890 | 9/2006 |
| WO | WO-03/049397 A2 | 6/2003 |

OTHER PUBLICATIONS

Kawai, Hiroyuki et al., "Likelihood Function for QRM-MLD Suitable for Soft-Decision Turbo Decoding and Its Performance for OFCDM MIMO Multiplexing in Multipath Fading Channel," *IEICE Trans. Commun.*, vol. E88-B(1):47-57 (2005).

(Continued)

*Primary Examiner* — David B. Lugo
(74) *Attorney, Agent, or Firm* — Nelson Mullins Riley & Scarborough LLP; EuiHoon Lee, Esq.

(57) ABSTRACT

Provided are an apparatus for receiving signals in an OFDM communication system using multiple transmission/reception antennas and a method thereof. The method includes modulating a predetermined part of a data stream based on a multi-dimensional reception procedure to generate a first modulated data stream; regenerating a symbol corresponding to the modulated data stream; eliminating the regenerated symbol from a remained data stream; modulating the eliminated data stream to generate a second modulated data stream; and outputting an output signal obtained by serializing the first modulated data stream and the second modulated data stream.

8 Claims, 9 Drawing Sheets

U.S. PATENT DOCUMENTS

| | | |
|---|---|---|
| 6,636,568 B2 | 10/2003 | Kadous |
| 6,757,337 B2 | 6/2004 | Zhuang et al. |
| 6,760,388 B2 | 7/2004 | Ketchum et al. |
| 2004/0165675 A1 | 8/2004 | Ito et al. |
| 2005/0190848 A1* | 9/2005 | Kiyanagii et al. ............ 375/260 |
| 2007/0189405 A1* | 8/2007 | Qu ............................... 375/260 |

OTHER PUBLICATIONS

Lee, Yuro et al., "A new MIMO algorithm for high data rate transmission," The 2nd International Conference on Wireless Broadband and Ultra Wideband Communications, (2007).

* cited by examiner

APPARATUS FOR RECEIVING SIGNALS IN OFDM COMMUNICATION SYSTEM HAVING MULTIPLE ANTENNAS AND METHOD THEREOF

RELATED APPLICATIONS

This application is a 35 U.S.C. §371 national stage filing of International Application No. PCT/KR2007/004666 filed on Sep. 21, 2007, which claims priority to, and the benefit of, Korean Patent Application No. 10-2006-0096167 filed on Sep. 29, 2006. The contents of the aforementioned applications are hereby incorporated by reference.

TECHNICAL FIELD

The present invention relates to an efficiency apparatus for receiving signals in an orthogonal frequency division multiplexing (OFDM) communication system having multiple transmission/reception antennas and a method thereof.

This work was supported by the Information Technology (IT) research and development program of the Korean Ministry of Information and Communication (MIC) and the Korean Institute for Information Technology Advancement (IITA) [2006-S-002-01, "IMT-Advanced Radio Transmission Technology with Low Mobility"].

BACKGROUND ART

In a conventional wireless communication system, high-quality and a large amount of multimedia data should be transmitted through a limited frequency band. This calls for development of methods for transmitting a large amount of date through the limited frequency. The methods can be realized in the form of a Multiple Input Multiple Output (MIMO) system.

The MIMO system forms a plurality of independent fading channels by using multiple antennas in transmission/reception blocks and it can improve data transmission rate by transmitting different signals in each transmission antenna. Therefore, a large amount of data can be transmitted without expending frequency bandwidth.

However, the MIMO system has an inter symbol interference (ISI) occurring in high-speed data transmission, and weak frequency selective fading. In order to overcome these disadvantages, the MIMO system is applied to an Orthogonal Frequency Division Multiplexing (OFDM) method. The OFDM method is a multiplexing method which is most suitable for current high-speed data transmission. In the OFDM method, one data stream is transmitted through a sub-carrier frequency having a low data transmission rate. A channel environment for wireless communication has multiple paths due to obstacles, e.g., buildings. In a wireless channel having the multiple paths, a delay spread occurs due to the presence of multiple paths, and the ISI occurs when time of delay spread is greater than transmission time of the subsequent symbol. When frequency selective fading occurs in a frequency domain and a single-carrier is used, an equalizer is used to eliminate the ISI. The higher data transmission rate is, the more complex the equalizer is.

As a result, when the MIMO system and the OFDM system are integrated, advantages of the MIMO system are used and disadvantages of the MIMO system can be offset by the OFDM system. A general MIMO system has N transmission antennas and N receiving antennas. Thus, a MIMO-OFDM system is formed by integrating the MIMO system and the OFDM method.

Figure 1:
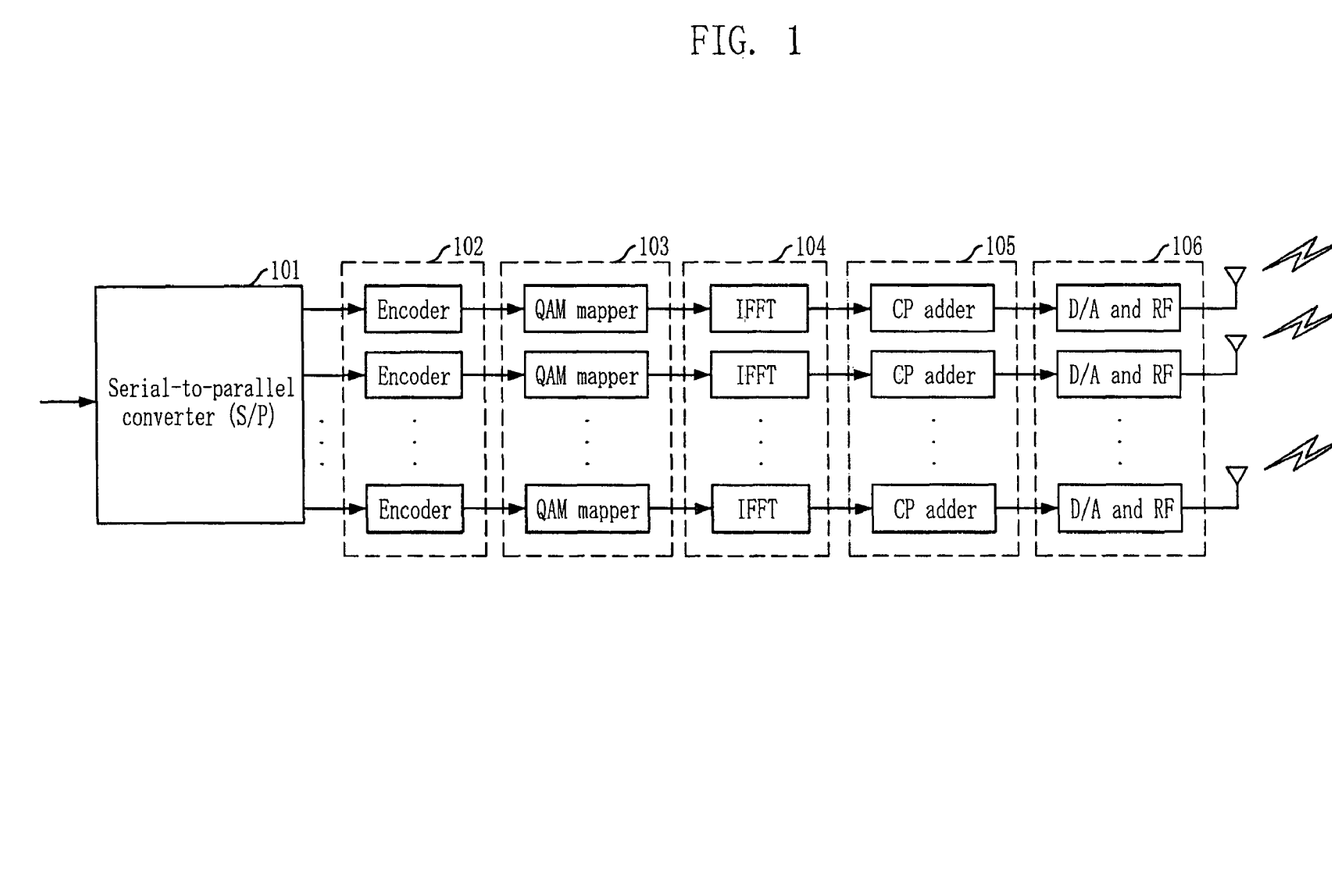
FIGS. 1 and 2 are block diagrams illustrating a conventional Multiple Input Multiple Output-Orthogonal Frequency Division Multiplexing (MIMO-OFDM) system.
Figure 2:
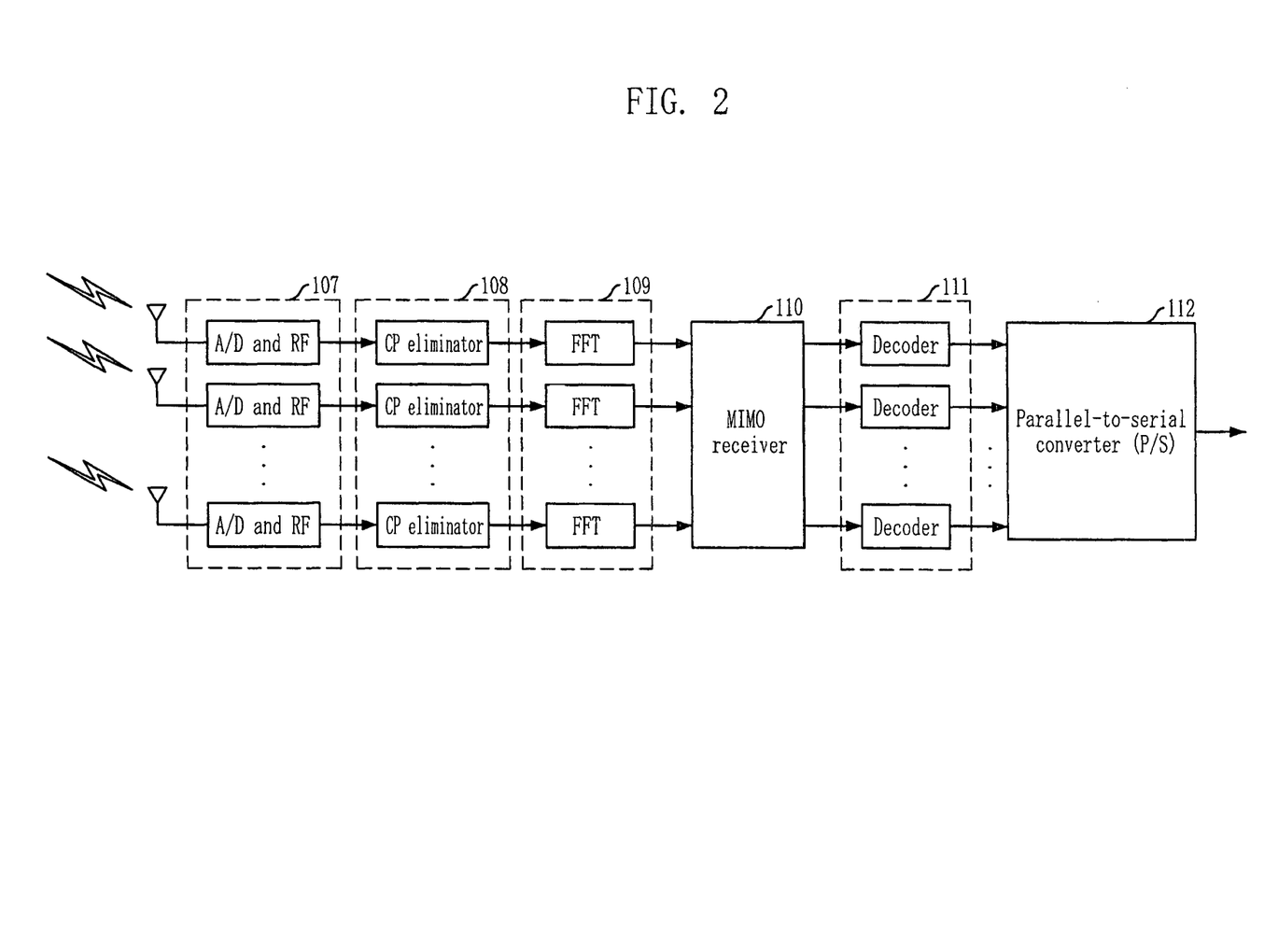

FIGS. 1 and 2 are block diagrams illustrating a conventional Multiple Input Multiple Output-Orthogonal Frequency Division Multiplexing (MIMO-OFDM) system.

FIG. 1 is a transmission block of the MIMO-OFDM system. The transmission block includes a serial-to-parallel (S/P) converter 101, an encoder 102, a quadarure amplitude multiplexing (QAM) mapper 103, an inverse fast Fourier transformer (IFFT) 104, a cyclic prefix (CP) adder 105, and a digital-to-analog conversion and radio frequency processing unit (D/A and RF unit) 106.

The S/P converter 101 divides transmission data into a plurality of data streams to be transmitted through transmission antennas before encoding. Each encoder 102 encodes each data stream. The QAM mapper 103 modulates the encoded data stream based on a modulating method, e.g., binary phase shift keying (BPSK), quadrature phase shift keying (QPSK), 16 quadrature amplitude multiplexing (16QAM) and 64QAM, and generates a modulated symbol.

The IFFT 104 transforms the modulated symbol into a time domain symbol. The CP adder 105 adds a CP to a front of the time domain symbol. In the D/A and RF unit 106, the D/A converter converts the CP-added symbol into an analog signal, and the analog signal is transmitted through the RF unit.

FIG. 2 is a reception block of the MIMO-OFDM system. The reception block includes a analog-to-digital conversion and radio frequency processing unit (A/D and RF unit) 107, CP eliminator 108, fast Fourier transformer (FFT) 109, a MIMO receiver 110, decoder 111, and a parallel-to-serial (P/S) converter 112.

In the A/D and RF unit 107, an analog signal is received through the RF unit, and the A/D converter converts the received analog signal into a digital signal. The CP eliminator 108 eliminates a CP from the digital signal. The FFT 109 performs FFT to each of parallel digital signals.

The MIMO receiver 110 estimates a symbol of transmission data, and calculates a log likely-hood ratio (LLR) based on the estimated symbol. Each decoder 111 decodes each of data streams to estimate the transmission data. The P/S converter 112 serializes the parallel data streams into a serial data stream.

In examples of the MIMO receiver, there are a decision feedback equalizer (DFE), a zero forcing (ZF), a minimum mean square error estimation (MMSE) and a bell labs layered space-time (BLAST). Complexities of the above receivers are smaller than complexity of a maximum likelihood detection (MLD), but performances of the above receivers are not better than that of the MLD.

DISCLOSURE OF INVENTION

Technical Problem

It is, therefore, an object of the present invention to providing an apparatus for receiving signals in an Multiple Input Multiple Output-Orthogonal Frequency Division Multiplexing (MIMO-OFDM) communication system which receives signals with relatively low complexity and has good performance than a linear receiver, and a method thereof.

Other objects and advantages of the present invention will be clearly understood by the following description and embodiments. Also, it is obvious to those skilled in the art that the objects and advantages of the present invention can be realized by the means as claimed and combinations thereof.

Technical Solution

In accordance with one aspect of the present invention, there is provided a method for receiving signals in an Orthogonal Frequency Division Multiplexing (OFDM) communication system using multiple transmission/reception antennas, including: modulating a predetermined part of a data stream based on a multi-dimensional reception procedure to generate a first modulated data stream; regenerating a symbol corresponding to the modulated data stream; eliminating the regenerated symbol from a remained data stream; modulating the eliminated data stream to generate a second modulated data stream; and outputting an output signal obtained by serializing the first modulated data stream and the second modulated data stream.

In accordance with another aspect of the present invention, there is provided an apparatus for receiving signals in an OFDM communication system using multiple transmission/reception antennas, including: a multi-dimensional receiver for modulating a predetermined part of a data stream based on a multi-dimensional reception procedure to generate a first modulated data stream; a symbol regenerator for regenerating a symbol corresponding to the modulated data stream; a interference eliminator for eliminating the regenerated symbol from a remnant data stream; a modulator for modulating the eliminated data stream to generate a second modulated data stream; and a parallel-to-serial converter for outputting an output signal obtained by serializing the first modulated data stream and the second modulated data stream.

Advantageous Effects

The present invention can provide an apparatus for receiving signals in a Multiple Input Multiple Output-Orthogonal Frequency Division Multiplexing (MIMO-OFDM) communication system which receives signals with relatively low complexity and has good performance than a linear receiver, and a method thereof.

That is, the present invention can improve a reception performance and reduce the complexity (which means the amount of computation) by first modulating a pre-determined part of a data stream in a multi-dimensional detector, regenerating the data, eliminating the regenerated data from a received signal and modulating the remained signal by using the linear receiver.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Figure 3:
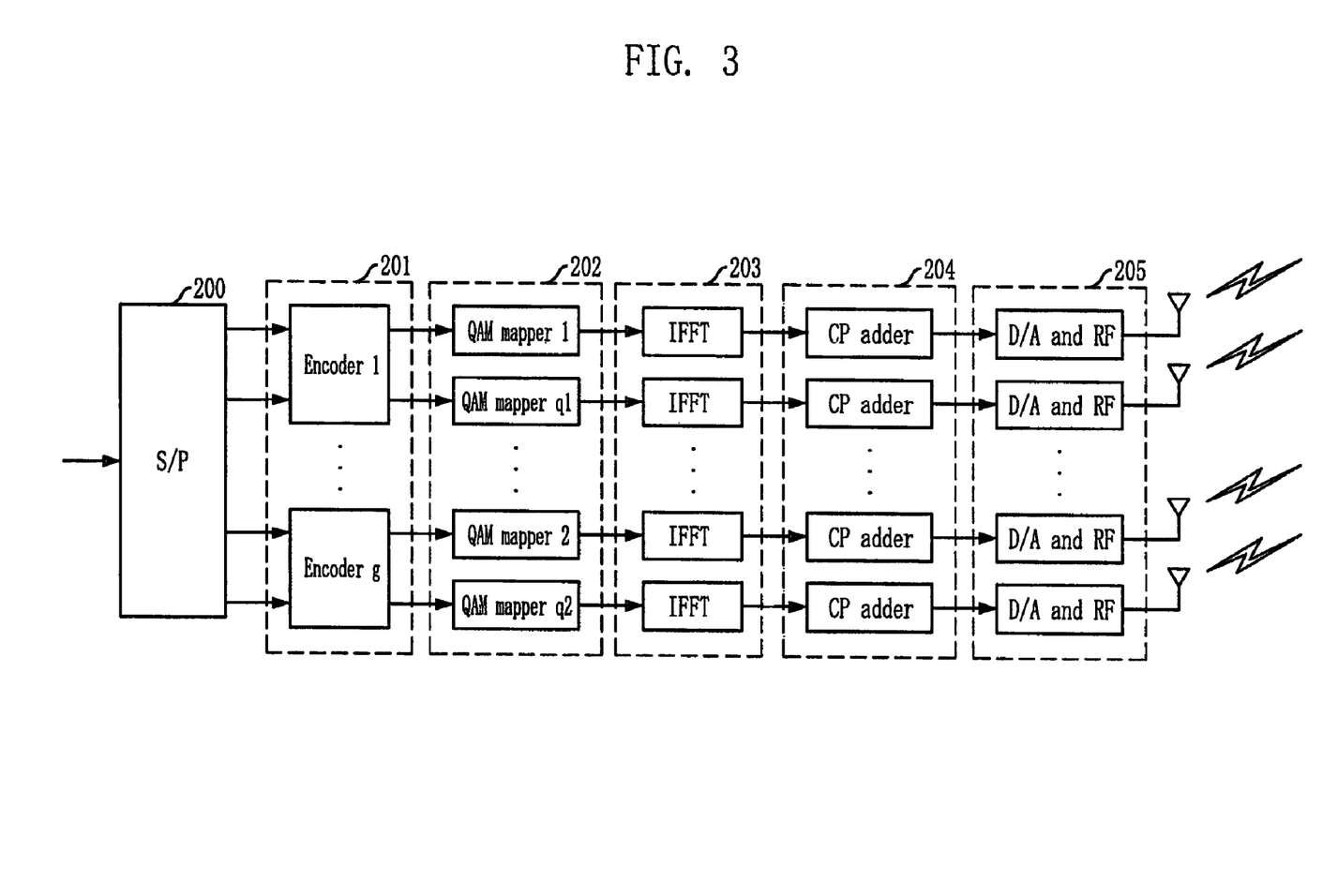
FIG. 3 is a block diagram illustrating a transmission block of the MIMO-OFDM system to which the present invention is applied.

FIG. 3 is a block diagram illustrating a transmission block of a Multiple Input Multiple Output-Orthogonal Frequency Division Multiplexing (MIMO-OFDM) system to which the present invention is applied.

As shown, the transmission block of the MIMO-OFDM system includes an S/P converter 200, encoders 201, QAM mappers 202, IFFTs 203, CP adders 204 and D/A and RF units 205.

A plurality of data streams are inputted into g encoders 201. Each of q QAM mappers 202 connected with g encoders has a different channel code rate and a different modulation method.

Because the S/P converter 200, the IFFTs 203, the CP adders 204 and the D/A and RF units 205 are the same as the S/P converter 101, the IFFTs 104, the CP adders 105 and the D/A and RF units 106, respectively, detailed description on them will be omitted.

Figure 4:
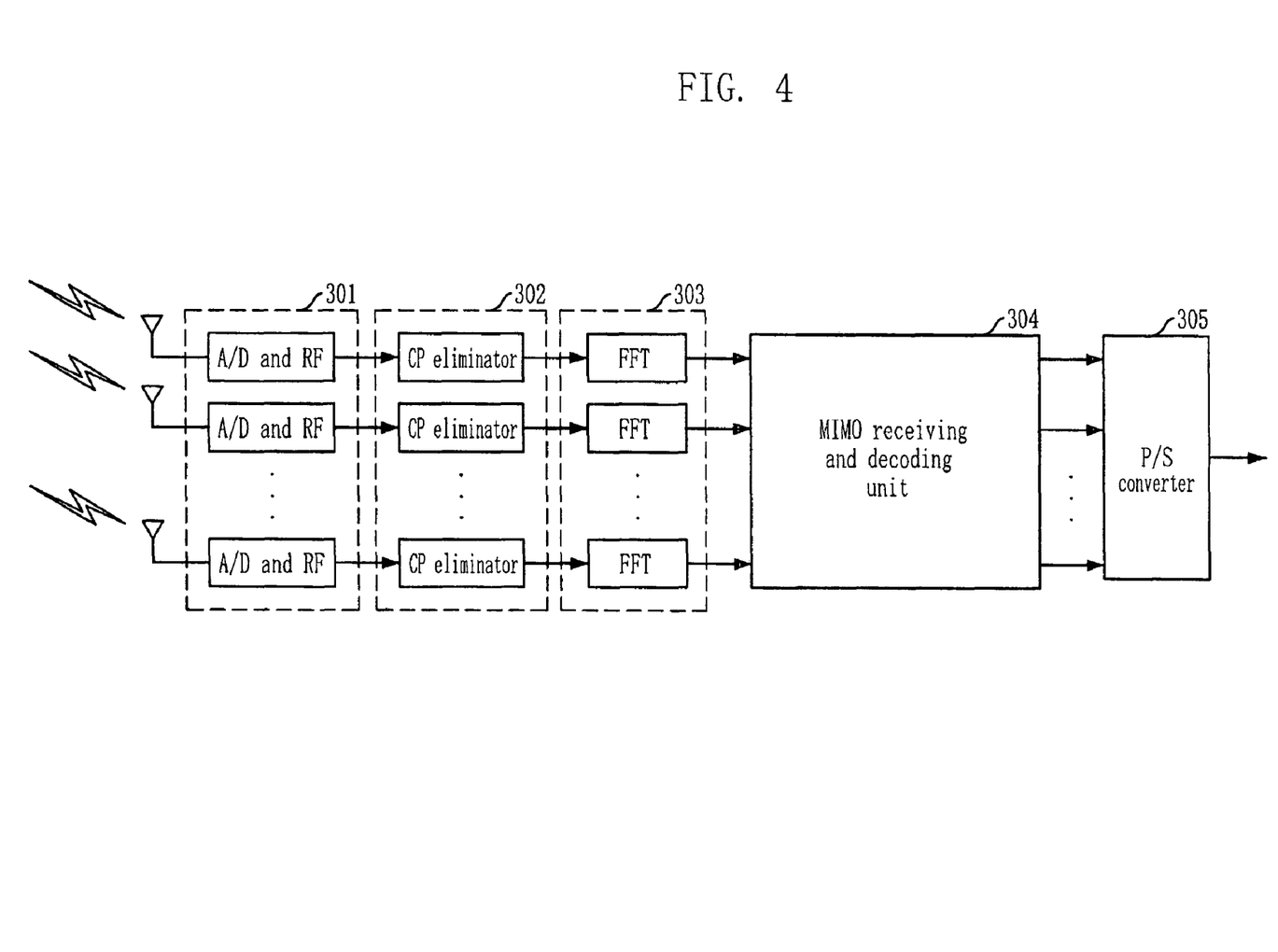
FIG. 4 is a block diagram illustrating a reception block of the MIMO-OFDM system to which the present invention is applied.

FIG. 4 is a block diagram illustrating a reception block of the MIMO-OFDM system to which the present invention is applied.

As shown, the reception block of the MIMO-OFDM system includes analog-to-digital conversion and radio frequency processing (A/D and RF) units 301, CP eliminators 302, fast Fourier transformers (FFT) 303, a MIMO receiving and decoding unit 304, and a parallel-to-serial (P/S) converter 305.

Figure 5:
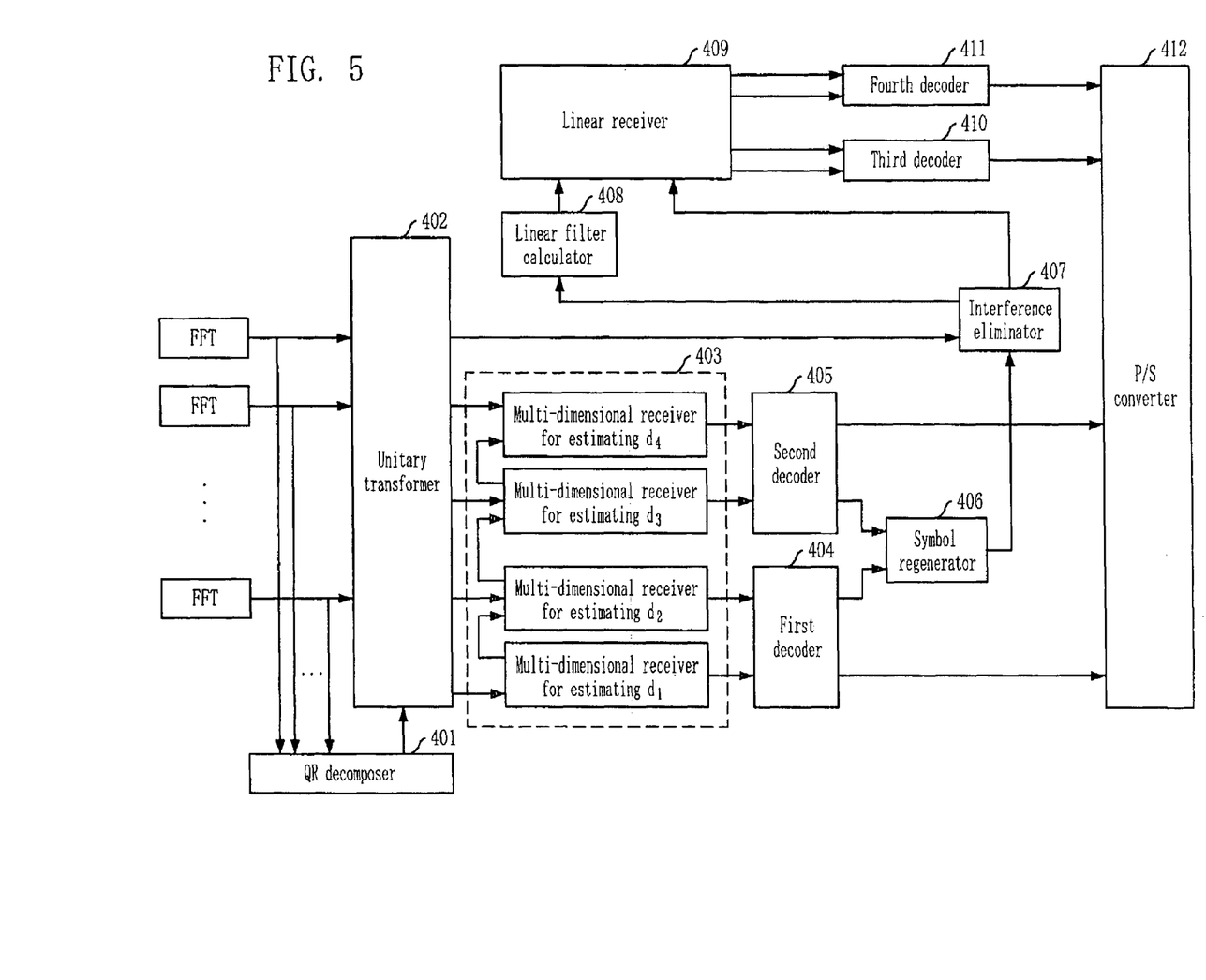
FIG. 5 is a block diagram illustrating a MIMO receiving and decoding block in accordance with a first embodiment of the present invention.
Figure 6:
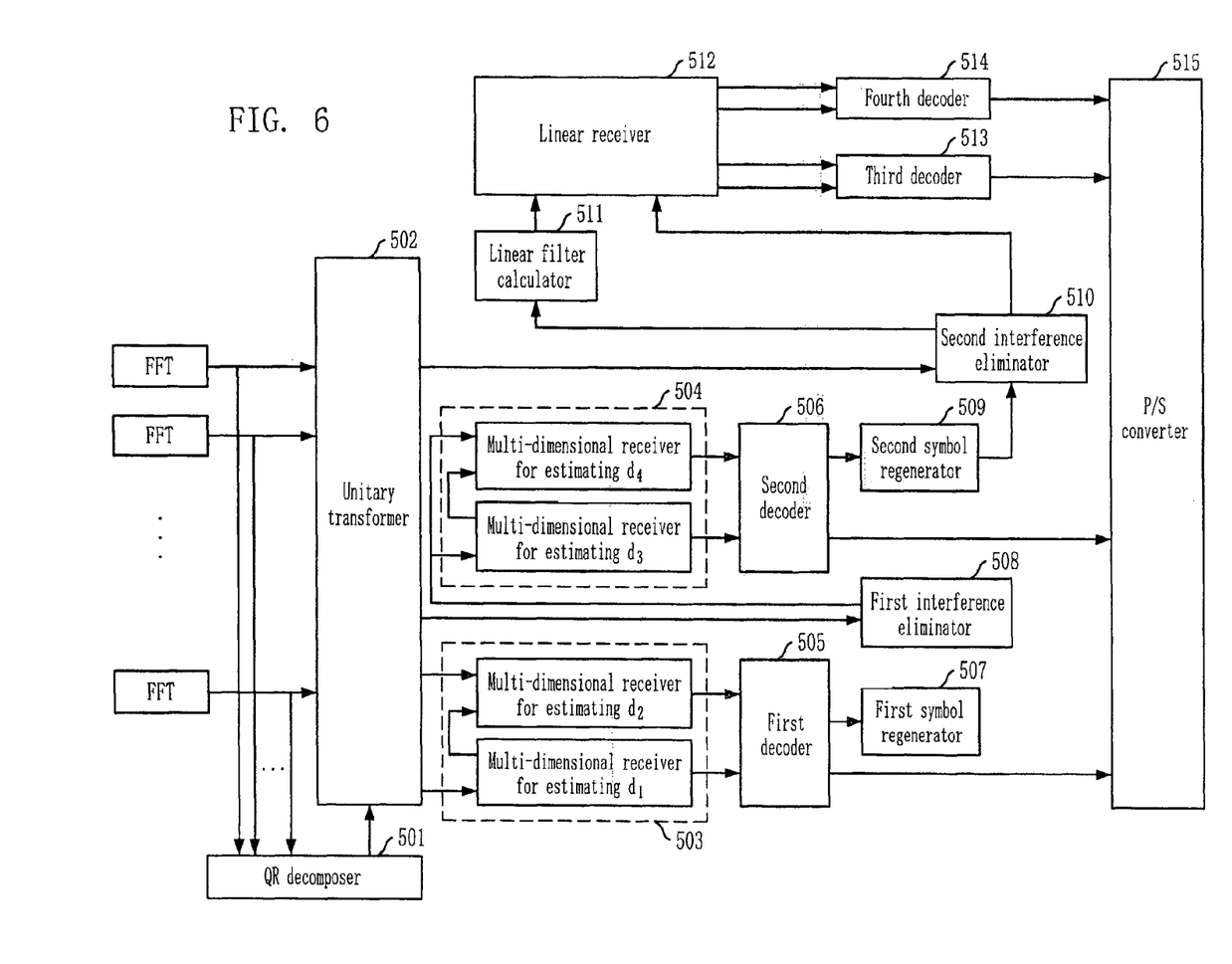
FIG. 6 is a block diagram illustrating a MIMO receiving and decoding block in accordance with a second embodiment of the present invention.
Figure 7:
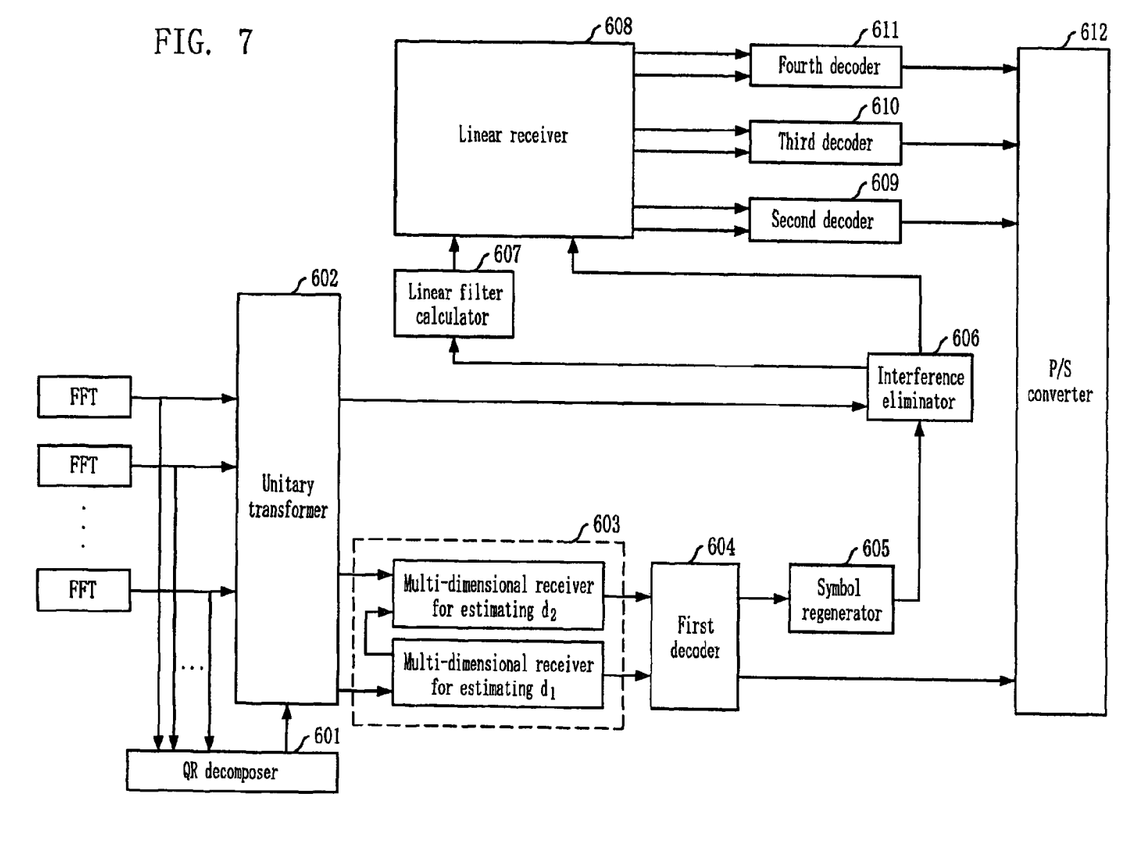
FIG. 7 is a block diagram illustrating a MIMO receiving and decoding block in accordance with a third embodiment of the present invention.

The reception block demodulates a reception date in the MIMO receiving and decoding unit 304 after performing FFT. For example, in FIG. 2, when the number of encoder g is equal to 4 and the number of transmission antennas q1 is equal to 2, such that q is equal to 8, there are various MIMO reception methods. FIGS. 5 to 7 represent various MIMO receiving and decoding blocks corresponding to the various MIMO reception methods, respectively.

FIG. 5 is a block diagram illustrating a first MIMO receiving and decoding unit in accordance with a first embodiment of the present invention.

As shown, the first MIMO receiving and decoding unit includes a QR decomposer 401, a unitary transformer 402, a multi-dimensional detector 403, a first decoder 404, a second decoder 405, a symbol regenerator 406, an interference eliminator 407, a linear filter calculator 408, a linear receiver 409, a third decoder 410 and a fourth decoder 411.

The QR decomposer 401 decomposes FFT-performed reception data streams into QR. The unitary transformer 402 performs unitary transformation of the FFT-performed reception data streams based on a unitary transformation matrix QH, which is generated by a QR decomposition in the QR decomposer 401.

The multi-dimensional detector 403 demodulates a predetermined part of the data streams, i.e., $d_1$, $d_2$, $d_3$ and $d_4$, based on a multi-dimensional reception procedure to generate first demodulated data. The multi-dimensional reception procedure will be described later.

The first decoder 404 and the second decoder 405 decode the first demodulated data. The symbol regenerator 406 regenerates a symbol by modulating the decoded signals. The interference eliminator 407 subtracts the regenerated symbol from the output signal of the unitary transformer 402.

The linear filter calculator 408 is a linear filter for estimating an output symbol vector of the interference eliminator 407. The linear detector 409 demodulates the remained data stream, i.e., $d_5$, $d_6$, $d_7$ and $d_8$, based on the interference eliminated signal to generate second demodulated data.

The third decoder 410 and the fourth decoder 411 decode the second demodulated data and output the second decoded data into a parallel-to-serial (P/S) converter 412. The P/S converter 412 serializes the first decoded data based on the multi-dimensional reception procedure and the second decoded data into a data stream and outputs it.

In FIG. 5, it is assumed that the number of transmission antennas is M, and the number of reception antennas is N. Then, a reception vector Y of a predetermined sub-carrier after performing FFT is expressed as the following Eq. 1. Hereinafter, expression of vectors and subscripts are used as the same as the previous usage.

$$Y = Hd + n \qquad \text{Eq. 1}$$

Herein, $$Y = \begin{bmatrix} y_N \\ y_{N-1} \\ \vdots \\ y_1 \end{bmatrix},$$

channel $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix},$$

transmission symbol $$d = \begin{bmatrix} d_M \\ d_{M-1} \\ \vdots \\ d_1 \end{bmatrix},$$

and $n$ is noise vector.

The channel H is QR-decomposed in the QR decomposer 401, it can be expressed as H=QR. Therefore, a matrix R can be expressed the following Eq. 2.

$$R = Q^H H = \begin{bmatrix} r_{1,1} & r_{1,2} & \cdots & r_{1,M} \\ 0 & r_{2,2} & \cdots & r_{2,M} \\ 0 & \vdots & \ddots & \vdots \\ 0 & \cdots & 0 & r_{M,M} \end{bmatrix} \qquad \text{Eq. 2}$$

In Eq. 2, a reception vector throughout the unitary transformer 402 is expressed as the following Eq. 3.

$$Z = \begin{bmatrix} z_M \\ z_{M1} \\ \vdots \\ z_1 \end{bmatrix} \qquad \text{Eq. 3}$$

$$= Q^H Y = RD + n'$$

$$= \begin{bmatrix} r_{1,1} & r_{1,2} & \cdots & r_{1,M} \\ 0 & r_{22} & \cdots & r_{2,M} \\ 0 & \vdots & \ddots & \vdots \\ 0 & \cdots & 0 & r_{M,M} \end{bmatrix} \begin{bmatrix} d_M \\ d_{M1} \\ \vdots \\ d_1 \end{bmatrix} + \begin{bmatrix} n'_1 \\ n'_2 \\ \vdots \\ n'_M \end{bmatrix}$$

In reference to FIG. 5 and Eqs. 1 to 3, M is equal to 8, and N is equal to or larger than 8.

There are various combinations of signal generation performed in the symbol regenerator 406, interference elimination performed in the interference eliminator 407 and the number of data streams modulated at initial. For example, all data stream can be modulated in the multi-dimensional receiver in reference to FIG. 9, or data streams can be modulated by using interference elimination and linear receiver.

FIG. 6 is a block diagram illustrating a second MIMO receiving and decoding unit in accordance with a second embodiment of the present invention; and FIG. 7 is a block diagram illustrating a third MIMO receiving and decoding unit in accordance with a third embodiment of the present invention.

The interference elimination and the linear receiver are included in FIGS. 6 and 7. In FIG. 6, 2-stage interference elimination operates; and in FIG. 7, one data stream is first modulated, symbol regeneration and the interference elimination are performed, and the remained three data streams are modulated by using the linear receiver.

In FIGS. 6 and 7, functions of elements, which have the same named elements in FIG. 5, are the same as those of elements in FIG. 5. Therefore, detailed descriptions will be omitted.

As shown in FIG. 6, the second MIMO receiving and decoding unit includes a QR decomposer 501, a unitary transformer 502, a first multi-dimensional detector 503, a second multi-dimensional detector 504, a first decoder 505, a second decoder 506, a first symbol regenerator 507, a second symbol regenerator 509, a first interference eliminator 508, a second interference eliminator 510, a linear filter calculator 511, a linear receiver 512, a third decoder 513 and a fourth decoder 514.

As shown in FIG. 7, the third MIMO receiving and decoding unit includes a QR decomposer 601, a unitary transformer 602, a multi-dimensional detector 603, a first decoder 604, a symbol regenerator 605, a interference eliminator 606, a linear filter calculator 607, a linear receiver 608, a second decoder 609, a third decoder 610 and a fourth decoder 611.

Figure 8:
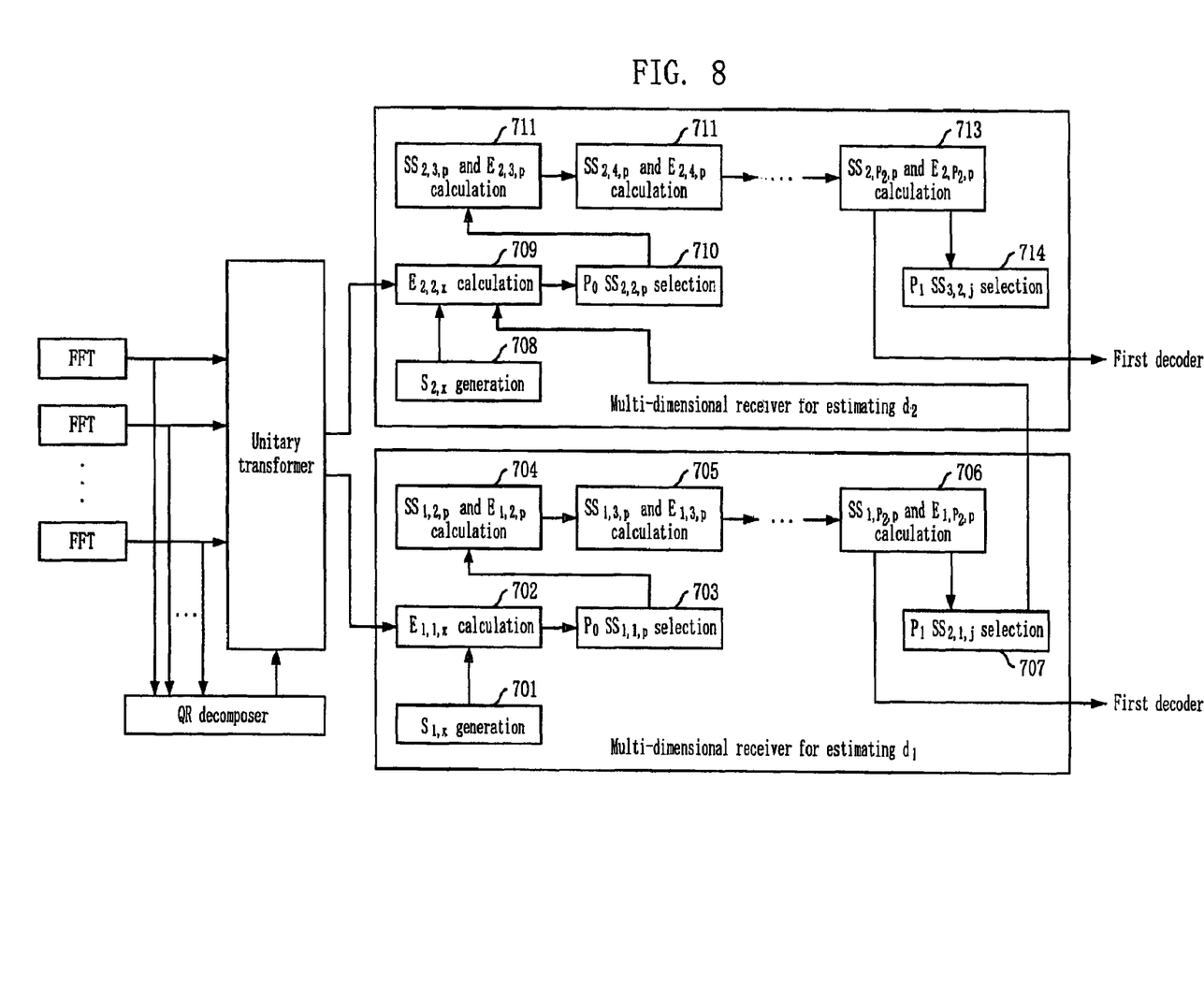
FIG. 8 is a block diagram illustrating a multi-dimensional detector in accordance with the present invention.

FIG. 8 is a block diagram illustrating a multi-dimensional detector in accordance with the present invention.

The multi-dimensional detector 403 in FIG. 5 and the multi-dimensional detectors 503 and 504 in FIG. 6 perform the multi-dimensional reception procedure described in detail hereinafter.

In reference to FIG. 8, the multi-dimensional detector 603 of the receiving and decoding unit in FIG. 7 includes a multi-dimensional receiver for estimating $d_1$ and a multi-dimensional receiver for estimating $d_2$.

The multi-dimensional receiver for estimating $d_1$ includes a symbol duplicating unit 701, a reliability calculating unit 702 and 703, and a hard-decision value and reliability calculating unit 704, 705 and 706.

The symbol duplicating unit 701 generates X replicas by duplicating the symbol for demodulating. The reliability calculating unit 702 and 703 calculates reliability of the replicas and selects ($P_0$) the replicas having high reliability. The hard-decision value and reliability calculating unit (704, 705 and 706) calculates a hard-decision value and a reliability of a symbol received from a different antenna based on the selected replicas having high reliability.

In order to demodulate a symbol $d_1$ located the lowest row in Eq. 3, the symbol duplicating unit 701 generates X replicas of $d_1$. The number of replicas is determined based on a modulation method. For example, QPSK has 4 possibility symbols, i.e., {(1,1) (1,−1) (−1,1) (−1,−1)}, 16QAM has 16 possibility symbols and 64QAM has 64 possibility symbols. That is, the number of replicas for QPSK is 4, the number of replicas for 16QAM is 16 and the number of replicas for 64QAM is 64.

The 702 block of the reliability calculating unit calculates the reliability of the replicas to detect $d_1$. Here, the replicas x are defined from 1 to X. There are various methods for obtaining the reliability of the replicas.

For example, There are an Euclidian distance, i.e., $E_{1,1,x} = |z_1 - r_{M,M} S_{1,x}|$, where the first subscription '1' of $E_{1,1,x}$ is defined for detecting '$d_1$' and an square of the Euclidian distance to obtain the reliability of the replicas. In present invention, the square of the Euclidian distance is used for sake of convenience. As the Euclidian distance is smaller, the reliability becomes high.

The 703 block of the reliability calculating unit selects the $P_0$ replicas having higher reliability than a predetermined level.

Operations of the hard-decision value and reliability calculating unit 704, 705 and 706 are described hereinafter.

First, $p^{th}$ replica among the $P_0$ replicas are defined as $SS_{1,1,p}$, where $p=1, \ldots, P_0$. Herein the first subscription '1' is defined for detecting '$d_1$' and the second subscription '1' is defined for distinguishing signal received from other antennas.

The hard-decision value of the $SS_{1,2,p}$ is defined as $SS_{1,2,p} = \text{slicer}\{(z_2 - r_{M-1,M} SS_{1,1,p})/r_{M-1,M-1}\}$, where the slicer{•} denotes mapping to a constellation, which is nearest in each modulation methods, i.e., QPSK, 16QAM, 64QAM.

The 704 block finds the constellation based on the hard-decision value, calculates the reliability based on the following Eq. 4.

$$E_{1,2,p} = |z_2 - r_{M-1,M-1} SS_{1,2,p} - r_{M-1,M} SS_{1,1,p}|^2 + E_{1,1,p} \qquad \text{Eq. 4}$$

The 705 block finds the hard-decision value of $SS_{1,3,p}$ by using $SS_{1,1,p}$ and $SS_{1,2,p}$, where $SS_{1,3,p} = \text{slicer}\{(z_3 - r_{M-2,M-1} SS_{1,2,p} - r_{M-2,M} SS_{1,1,p})/r_{M-2,M-2}\}$, and calculates the reliability based on the following Eq. 5.

$$E_{1,3,p} = |z_3 - r_{M-2,M-2} SS_{1,3,p} - r_{M-2,M-1} SS_{1,2,p} - r_{M-2,M} SS_{1,1,p}|^2 + E_{1,2,p} \qquad \text{Eq. 5}$$

The hard-decision value and reliability calculations are repeated until the hard-decision value of $SS_{1,P_2,p}$ and the reliability of $E_{1,P_2,p}$ are obtained. Herein, $P_2$ denotes one value from 2 to M. The hard-decision value and reliability calculations can be generalized as the following Eq. 6.

$$SS_{1,P_2,p} = \text{slicer}\left\{\left(z_{P_2} - \sum_{i=1}^{P_2-1} r_{M-(P_2-1),M-(i-1)} SS_{1,i,p}\right) r_{M-(P_2-1),M-(P_2-1)}\right\} \qquad \text{Eq. 6}$$

$$E_{1,P_2,p} = \left|z_{P_2} - \sum_{i=1}^{P_2} r_{M-(P_2-1),M-(i-1)} SS_{1,i,p}\right|^2 + E_{1,P_2-1,p}$$

As shown in FIG. 8, the multi-dimensional receiver for estimating $d_2$ includes a symbol duplicating unit 708, a reliability calculating unit 709 and 710, and a hard-decision value and reliability calculating unit 711, 712 and 713.

In order to estimate $d_2$, the 707 block selects $P_1$ symbols, $SS_{2,1,j}$, among the $P_0$ hard-decision values based on the value of reliability, where j is defined from 1 to $P_1$. Here, the Euclidian distance is $E_{1,1,j}$, i.e., $E_{2,1,j}$.

Symbol replicas for estimating $d_2$ generated in the symbol duplicating unit 708 is $S_{2,x}$, the reliability calculated in the 709 block is $$E_{2,2,x} = |z_2 - r_{M-1,M-1} SS_{2,x} - r_{M-1,M} SS_{2,1,j}| + E_{1,1,j}, \text{ where x is defined from 1 to } P_1 \times X.$$

The 710 block selects $P_0$ symbols having a small Euclidian distance among the $P_1 \times X$ reliabilities, i.e., $E_{2,2,j}$. Next, the hard-decision value is calculated and the reliability calculation is performed from the 711 block.

A $p^{th}$ symbol among the selected $P_0$ symbols is defined as $SS_{2,2,p}$, where $p=1, \ldots, P_0$.

When the reliability of the $SS_{2,2,p}$ denotes $E_{2,2,p}$, the hard-decision value of the $SS_{2,3,p}$ is defined as $SS_{2,3,p} = \text{slicer}\{(z_3 - r_{M-2,M-1} SS_{2,2,p})/r_{M-2,M-2}\}$ and the reliability of the $SS_{2,3,p}$ is defined as $E_{2,3,p} = |z_3 - r_{M-2,M-2} SS_{2,3,p} - r_{M-2,M-1} SS_{2,2,p}| + E_{2,2,p}$.

Like the $d_1$ estimating procedure, the hard-decision value and reliability calculations are repeated until the hard-decision value of $SS_{2,p2,p}$ and the reliability of $E_{2,p2,p}$ are obtained.

In FIG. 7, if the output signal received from the decoder 604 is the same as the transmission data, regenerated symbols $d_1$ and $d_2$ generated in the symbol regenerator 605 are eliminated in the interference eliminator 606 from the reception signal Z perfectly. The d1 and d2 eliminated reception signal Z' is expressed as the following Eq. 7.

$$Z' = \begin{bmatrix} z'_M \\ z'_{M-1} \\ \vdots \\ z'_3 \end{bmatrix} \qquad \text{Eq. 7}$$

$$= R'd'$$

$$= \begin{bmatrix} r_{1,1} & r_{1,2} & \cdots & r_{1,M3} \\ 0 & r_{2,2} & \cdots & r_{2,M-3} \\ 0 & \vdots & \ddots & \vdots \\ 0 & \cdots & 0 & r_{M-3,M-3} \end{bmatrix} \begin{bmatrix} d_M \\ d_{M-1} \\ \vdots \\ d_3 \end{bmatrix} + \begin{bmatrix} n'_1 \\ n'_2 \\ \vdots \\ n'_{M-3} \end{bmatrix}$$

Figure 9:
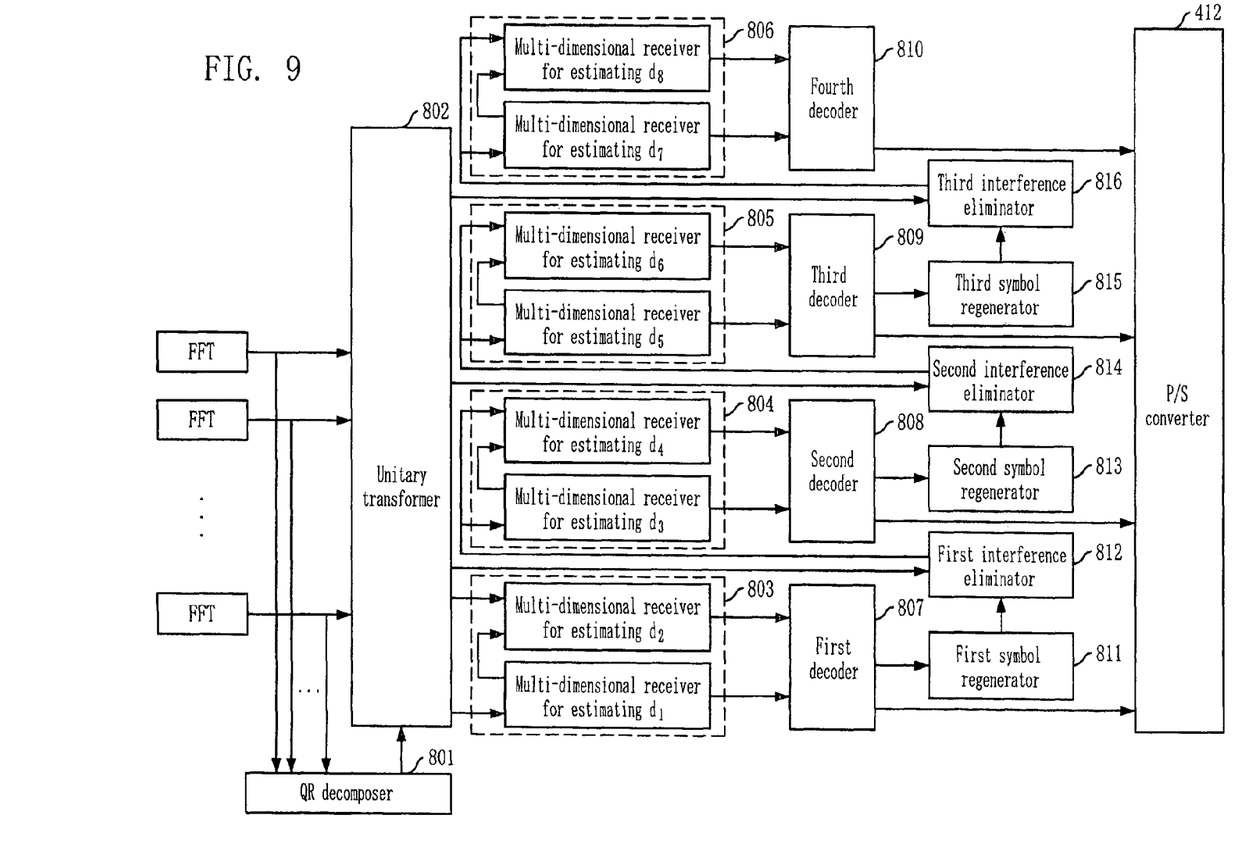
FIG. 9 is a block diagram illustrating a MIMO receiving and decoding block in accordance with a fourth embodiment of the present invention.

FIG. 9 is a block diagram illustrating a fourth MIMO receiving and decoding unit in accordance with a fourth embodiment of the present invention.

As shown, the fourth MIMO receiving and decoding unit includes a QR decomposer 801, a unitary transformer 802, a first multi-dimensional detector 803, a second multi-dimensional detector 804, a third multi-dimensional detector 805, a fourth multi-dimensional detector 806, a first decoder 807, a second decoder 808, a third decoder 809, a fourth decoder 810, a first symbol regenerator 811, a first interference eliminator 812, a second symbol regenerator 813, a second interference eliminator 814, a third symbol regenerator 815 and a third interference eliminator 816.

While the present invention has been described with respect to certain preferred embodiments, it will be apparent to those skilled in the art that various changes and modifications may be made.

For example, in the above description, 4 data streams are encoded and transmitted through 8 transmission antennas, i.e., each data stream is transmitted through 2 transmission antennas. In reference to Eqs. 1 to 7 and FIGS. 5 to 7, a case that random X data streams transmitted through Y transmission antennas can be applied.

The present application contains subject matter related to Korean patent application No. 2006-0096167, filed with the Korean Intellectual Property Office on Sep. 29, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A method for receiving signals in an Orthogonal Frequency Division Multiplexing (OFDM) communication system using multiple transmission/reception antennas, comprising:
   demodulating a predetermined part of a data stream based on a multi-dimensional reception procedure to generate a first demodulated data stream;
   regenerating a symbol corresponding to the demodulated data stream;
   eliminating the regenerated symbol from a remained data stream;
   demodulating the eliminated data stream to generate a second demodulated data stream; and
   outputting an output signal obtained by serializing the first demodulated data stream and the second demodulated data stream.

2. The method as recited in the claim 1, wherein the multi-dimensional reception procedure includes:
   generating replicas of symbol which demodulated;
   calculating a reliability of the replicas and selecting the replicas having higher reliability than a predetermined level; and
   calculating a hard-decision value and a reliability of symbol from other antennas based on the selected replica.

3. The method as recited in the claim 2, wherein the number of the replicas is determined based on modulating methods.

4. The method as recited in the claim 2, wherein the reliability is calculated based on a square of a Euclidian distance.

5. An apparatus for receiving signals in an Orthogonal Frequency Division Multiplexing (OFDM) communication system using multiple transmission/reception antennas, comprising:
   a multi-dimensional receiving means for demodulating a predetermined part of a data stream based on a multi-dimensional reception procedure to generate a first demodulated data stream;
   a symbol regenerating means for regenerating a symbol corresponding to the demodulated data stream;
   a interference eliminating means for eliminating the regenerated symbol from a remnant data stream;
   a demodulating means for demodulating the eliminated data stream to generate a second demodulated data stream; and
   a parallel-to-serial converting means for outputting an output signal obtained by serializing the first demodulated data stream and the second demodulated data stream.

6. The apparatus as recited in the claim 5, wherein the multi-dimensional receiving means includes:
   a symbol duplicating means for generating replicas of symbol which demodulated;
   a reliability calculating means for calculating a reliability of the replicas and selecting the replicas having higher reliability than a predetermined level; and
   a hard-decision value and a reliability calculating means for calculating a hard-decision value and a reliability of symbol from other antennas based on the selected replica.

7. The apparatus as recited in the claim 6, wherein the number of the replicas is determined based on modulating methods.

8. The apparatus as recited in the claim 6, wherein the reliability is calculated based on a square of a Euclidian distance.

* * * * *